United States Patent
Kudo et al.

(10) Patent No.: US 9,238,718 B2
(45) Date of Patent: *Jan. 19, 2016

(54) HYDROGEL FORMING COMPOSITION AND HYDROGEL PRODUCED THEREFROM

(71) Applicants: NISSAN CHEMICAL INDUSTRIES, LTD., Tokyo (JP); RIKEN, Wako, Saitama (JP)

(72) Inventors: Yoshihiro Kudo, Funabashi (JP); Taichi Nakazawa, Funabashi (JP); Takuzo Aida, Wako (JP); Yasuhiro Ishida, Wako (JP); Shingo Tamesue, Wako (JP); Masataka Ohtani, Wako (JP)

(73) Assignees: NISSAN CHEMICAL INDUSTRIES, LTD., Tokyo (JP); RIKEN, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/429,234

(22) PCT Filed: Sep. 18, 2013

(86) PCT No.: PCT/JP2013/075154
§ 371 (c)(1),
(2) Date: Mar. 18, 2015

(87) PCT Pub. No.: WO2014/046127
PCT Pub. Date: Mar. 27, 2014

(65) Prior Publication Data
US 2015/0274899 A1 Oct. 1, 2015

(30) Foreign Application Priority Data

Sep. 18, 2012 (JP) .................... 2012-205087

(51) Int. Cl.
*C08J 3/075* (2006.01)
*C08K 5/053* (2006.01)
(Continued)

(52) U.S. Cl.
CPC ............. *C08J 3/075* (2013.01); *C08K 3/346* (2013.01); *C08K 5/053* (2013.01); *C08L 33/02* (2013.01); *C08L 33/06* (2013.01); *C08L 83/02* (2013.01); *C08L 101/14* (2013.01); *C08J 2333/02* (2013.01)

(58) Field of Classification Search
CPC ........ C08J 3/075; C08K 3/346; C08L 101/14; C08L 31/00
See application file for complete search history.

(56) References Cited

U.S. PATENT DOCUMENTS 8,957,145 B2 * 2/2015 Takeno et al. .................. 524/417
8,962,742 B2 * 2/2015 Takeno et al. .................. 524/560

FOREIGN PATENT DOCUMENTS

JP 2002-053629 A 2/2002
JP 2006-028446 A 2/2006
(Continued)

OTHER PUBLICATIONS

Tamesue, Shingo et al. "Jisedaigata Aquamaterial (Kogansuiritsu Kokyodo Hydrogel) no Sosei". Polymer Preprints, Japan. vol. 61 (2), pp. 2613-2614, 2012.
(Continued)

*Primary Examiner* — John Uselding
(74) *Attorney, Agent, or Firm* — Oliff PLC

(57) ABSTRACT

There is provided a self-supporting hydrogel that can be produced only through mixing at room temperature and that has a high mechanical strength. A hydrogel forming composition that is capable of forming a hydrogel having a self-supporting property, the hydrogel forming composition characterized by including: a water-soluble organic polymer having an organic acid salt structure or an organic acid anion structure; a silicate salt; a dispersant for the silicate salt; and a polyhydric alcohol, and having an extremely high mechanical strength.

11 Claims, 1 Drawing Sheet

(51) Int. Cl.
- C08L 33/02 (2006.01)
- C08L 83/02 (2006.01)
- C08L 101/14 (2006.01)
- C08K 3/34 (2006.01)
- C08L 33/06 (2006.01)

(56) References Cited

FOREIGN PATENT DOCUMENTS

| | | |
|---|---|---|
| JP | 2009-127035 A | 6/2009 |
| JP | 2009-270048 A | 11/2009 |
| JP | 2009-274924 A | 11/2009 |
| JP | 2011-153174 A | 8/2011 |
| JP | 4776187 B2 | 9/2011 |
| JP | 2012-036226 A | 2/2012 |
| WO | 2011/001657 A1 | 1/2011 |
| WO | 2012/023471 A1 | 2/2012 |

OTHER PUBLICATIONS

Tamesue, Shingo et al. "Jisedaigata Aquamaterial (Kogansuiritsu Kokyodo Hydrogel) no Sosei". Polymer Preprints, Japan. vol. 60 (2), pp. 5541-5542, 2011.

Wang, Qigang et al. "High-water-content mouldable hydrogels by mixing clay and a dendritic molecular binder". Nature, 463, pp. 339-343, 2010.

Aida, Takuzo. "Aqua Materials: A Possible Direction of Material Design toward the Realization of a Low-Carbon Society." Kobunshi, vol. 59 (9), pp. 712-713, 2010.

Aida, Takuzo. "Yuki, Hybrid-kei Bottom up-gata Nano Kukan Zairyo no Sosei to sono Kino". SORST Symposium 4 Koen Yoshishu, pp. 17-20, 2010.

Aida, Takuzo. "Kinosei Soft Material ni Mukete no Cho Bunshi Kagaku". CSJ: The Chemical Society of Japan Koen Yokoshu. vol. 90 (1), p. 116, 2010.

Aida, Takuzo. "Mizu ga Plastic ni naru". JST News. vol. 6 (12), pp. 10-11, 2010.

Tamesue, Shingo et al. "Jisedaigata Aquamaterial (Kogansuiritsu Kokyodo Hydrogel) no Sosei." CSJ: The Chemical Society of Japan Koen Yokoshu. vol. 92 (3), p. 981, 2012.

Labanda, Jordi et al. "Rheology changes of Laponite aqueous dispersions due to the addition of sodium polyacrylates of different molecular weights". Colloids and Surfaces A: Physicochem. Eng. Aspects. vol. 301, pp. 8-15, 2007.

Takeno, Hiroyuki et al. "Structural and Mechanical Properties of Composite Hydrogel Composed of Polymer and Nanoparticle". Polymer Preprints, Japan. vol. 61, No. 1, p. 683, 2012.

Takeno, Hiroyuki et al. "Structural and Mechanical Properties of polyelectrolyte/clay composite gels". Polymer Preprints, Japan. vol. 61, No. 2, pp. 4367-4368, 2012.

Nov. 19, 2013 International Search Report issued in PCT/JP2013/075154.

Nov. 19, 2013 Written Opinion issued in PCT/JP2013/075154.

\* cited by examiner

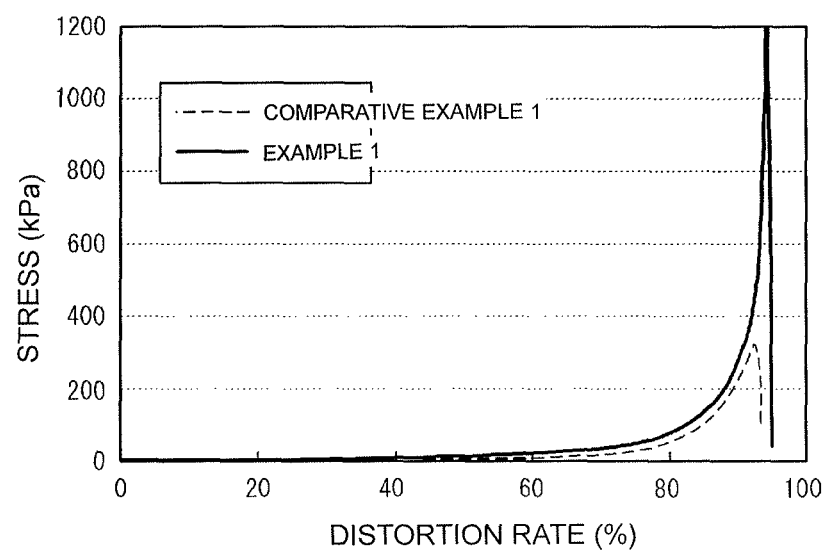

HYDROGEL FORMING COMPOSITION AND HYDROGEL PRODUCED THEREFROM

TECHNICAL FIELD

The present invention relates to a hydrogel, and in particular, to a hydrogel forming composition and a strengthened self-supporting hydrogel formed thereof.

BACKGROUND ART

Hydrogels have been recently attracting attention from the viewpoint that hydrogels are soft materials having high biocompatibility because of containing water as the main component and having a low environmental load.

As a high-strength hydrogel having a self-supporting property, an organic/inorganic composite hydrogel is disclosed that is obtained by performing a polymerization reaction of a (meth)acrylamide derivative in the coexistence with a layered clay mineral that is uniformly dispersed in water (Patent Document 1). As a similar example disclosed, an organic/inorganic composite hydrogel is also known that contains a polymer partially containing a group of a carboxylate salt or a carboxy-anion structure in poly(meth)acrylamide and a clay mineral (Patent Document 2).

In these examples disclosed, monomers are polymerized in an aqueous dispersion of a layered clay mineral, thereby causing a generated polymer and the clay mineral to form a three-dimensional network structure, which forms the organic/inorganic composite hydrogels.

An organic/inorganic composite polymer gel is known that contains an organic polymer obtained from a water-soluble organic monomer selected from acrylamides and methacrylamides, a water-swellable clay mineral, and a low-volatile medium such as glycerin and is produced through a hydrogel containing glycerin or the like (Patent Document 3).

As an organic/inorganic composite hydrogel having a self-supporting property that can be manufactured through mixing at room temperature, a hydrogel is known that is obtained by mixing a dendrimer compound having a polycationic functional group at its terminal and a layered clay mineral (Patent Document 4 and Non-Patent Document 1).

A dry clay film having a self-standing property (self-supporting property) is known that contains a polyacrylate salt and a clay mineral and is under evaluation as a surface protective material (Patent Document 5).

A research is known that relates to viscosity changes in an aqueous dispersion of a layered clay mineral (silicate salt) and sodium polyacrylate (Non-Patent Document 2). This is not a research related to a self-supporting organic/inorganic composite hydrogel, but a research on rheological changes in the aqueous dispersion.

Organic/inorganic composite hydrogels having a self-supporting property have been recently disclosed that can be produced only by mixing a polyelectrolyte, clay particles, and a dispersant (Non-Patent Document 3 and Non-Patent Document 4).

PRIOR ART DOCUMENTS

Patent Documents

Patent Document 1: Japanese Patent Application Publication No. 2002-053629 (JP 2002-053629 A)
Patent Document 2: Japanese Patent Application Publication No. 2009-270048 (JP 2009-270048 A)
Patent Document 3: Japanese Patent No. 4776187
Patent Document 4: Pamphlet of WO 2011/001657
Patent Document 5: Japanese Patent Application Publication No. 2009-274924 (JP 2009-274924 A)

Non-Patent Documents

Non-Patent Document 1: T. Aida, et al., Nature 463, 339 (2010)
Non-Patent Document 2: Colloids and Surfaces, A Physicochemical and Engineering Aspects (2007), 301 (1-3), 8-15
Non-Patent Document 3: Preprints of the 61st Annual Meeting of the Society of Polymer Science of Japan, Vol. 61, No. 1, p. 683 (2012)
Non-Patent Document 4: Preprints of the 61st Symposium on Macromolecules, 1S11 (2012)

SUMMARY OF THE INVENTION

Problems to be Solved by the Invention

However, the organic/inorganic composite gels disclosed in Patent Documents 1 to 3 can leave unreacted monomers that may be toxic and reagents such as a polymerization initiator in the gels. It is difficult for non-chemical manufacturers to manufacture organic/inorganic composite gels. It is also difficult to mold gels into a desired shape because hydrogels are formed after chemical reactions.

The hydrogels disclosed in Patent Document 4 and Non-Patent Document 1 have the issue that the manufacturing cost is high because the dendrimers contained in the hydrogels are manufactured through multi-step synthesis reactions.

Patent Document 5 discloses the production of a gel-like paste as an intermediate, which does not have a self-standing property. The gel-like paste is applied to a sheet, and a film after being dried has a self-standing property.

In Non-Patent Document 3 and Non-Patent Document 4, although an increased content of a clay mineral increases the mechanical strength of hydrogels, the viscosity of a sol in a gel production process also increases along with the increase in the concentration, which makes gelatinization work difficult.

In view of the above, there is a demand for a safe, high-strength self-supporting organic/inorganic composite hydrogel that can be produced by using industrially easily available raw materials and simply mixing them at room temperature.

The present invention has been achieved in view of the above circumstances, and an object thereof is to provide a strengthened self-supporting hydrogel that can be produced only through mixing at room temperature and a hydrogel forming composition for forming the hydrogel.

Means for Solving the Problems

As a result of earnest study for resolving the above issues, the inventors of the present invention have found out that a self-supporting hydrogel having remarkably increased mechanical strength can be achieved by adding a polyhydric alcohol to a hydrogel that can be produced from a water-soluble organic polymer having an organic acid salt structure or an organic acid anion structure, a silicate salt, and a dispersant for the silicate salt without increasing the content of the silicate salt, and have achieved the present invention.

Specifically, the present invention relates to, as a first aspect, a hydrogel forming composition that is capable of forming a hydrogel having a self-supporting property, the hydrogel forming composition characterized by comprising: a water-soluble organic polymer (A) having an organic acid salt structure or an organic acid anion structure; a silicate salt (B); a dispersant (C) for the silicate salt; and a polyhydric alcohol (D).

The present invention relates to, as a second aspect, the hydrogel forming composition according to the first aspect, in which the polyhydric alcohol is selected from the group consisting of glycerin, diglycerin, ethylene glycol, propylene glycol, butylene glycols, polyethylene glycol, and polypropylene glycol.

The present invention relates to, as a third aspect, the hydrogel forming composition according to the first aspect or the second aspect, in which the water-soluble organic polymer (A) is a water-soluble organic polymer compound having a carboxylate salt structure or a carboxy anion structure.

The present invention relates to, as a fourth aspect, the hydrogel forming composition according to the third aspect, in which the water-soluble organic polymer compound is a fully neutralized or partially neutralized polyacrylate salt.

The present invention relates to, as a fifth aspect, the hydrogel forming composition according to the fourth aspect, in which the water-soluble organic polymer compound is a fully neutralized or partially neutralized polyacrylate salt having a weight average molecular weight of 1,000,000 to 10,000,000.

The present invention relates to, as a sixth aspect, the hydrogel forming composition according to any one of the first to fifth aspects, in which the silicate salt (B) is a water-swellable silicate salt particle.

The present invention relates to, as a seventh aspect, the hydrogel forming composition according to the sixth aspect, in which the silicate salt (B) is a water-swellable silicate salt particle selected from the group consisting of smectite, bentonite, vermiculite, and mica.

The present invention relates to, as an eighth aspect, the hydrogel forming composition according to any one of the first to seventh aspects, in which the dispersant (C) is a dispersant for the water-swellable silicate salt particle.

The present invention relates to, as a ninth aspect, the hydrogel forming composition according to the eighth aspect, in which the dispersant (C) is one or two or more compounds selected from the group consisting of sodium orthophosphate, sodium pyrophosphate, sodium tripolyphosphate, sodium tetraphosphates, sodium hexametaphosphate, sodium polyphosphates, sodium poly(meth)acrylate, ammonium poly(meth)acrylate, poly(sodium acrylate-co-sodium maleate), poly(ammonium acrylate-co-ammonium maleate), sodium hydroxide, hydroxyamine, sodium carbonate, sodium silicate, polyethylene glycols or polypropylene glycols having a weight average molecular weight of from 200 to 20,000, sodium humate, and sodium ligninsulfonate.

The present invention relates to, as a tenth aspect, a hydrogel having a self-supporting property, formed of the hydrogel forming composition as described in any one of the first to ninth aspects.

The present invention relates to, as an eleventh aspect, the hydrogel according to the tenth aspect, in which 10% by mass or more of a polyhydric alcohol is contained relative to 100% by mass of the hydrogel.

Effects of the Invention

As described above, the hydrogel forming composition according to the present invention can provide a high-strength self-supporting hydrogel only by mixing raw materials that are industrially easily available and are as highly safe as used as cosmetics and quasi-drugs. By pouring the hydrogel forming composition into a mold or extrusion molding the hydrogel forming composition before gelatinization, a gel having a desired shape can be produced. Any covalent bond forming reaction such as a polymerization reaction is not required on gelatinization, and the gelatinization can be performed even at room temperature, which produces the effect of giving a high level of safety from the viewpoint of manufacturing processes. By adjusting the contents of the respective components, strength of the gel can be controlled, and a hydrogel having transparency can be produced.

The hydrogel according to the present invention can be formed easily and safely by mixing highly safe raw materials and has a high-strength self-supporting property and transparency. The hydrogel according to the present invention can be easily formed into a desired shape by pouring the hydrogel forming composition into a mold or extrusion molding the hydrogel forming composition before the gelatinization. By adjusting the contents of the respective raw materials used, its mechanical strength can be controlled.

BRIEF DESCRIPTION OF THE DRAWINGS

FIG. 1 is a diagram showing a measurement result of a piercing strength test on a hydrogel in Example 2.

MODES FOR CARRYING OUT THE INVENTION

The present invention relates to a hydrogel forming composition that can form a hydrogel having a self-supporting property, the hydrogel forming composition characterized by comprising a water-soluble organic polymer (A) having an organic acid salt structure or an organic acid anion structure, a silicate salt (B), a dispersant (C) for the silicate salt, and a polyhydric alcohol (D).

The hydrogel forming composition and the hydrogel formed thereof according to the present invention may contain, in addition to the above components (A) to (D), any other components as necessary to the extent that the intended effects of the present invention are not impaired.

[Hydrogel Forming Composition] <Component (A): Water-Soluble Organic Polymer>

The component (A) according to the present invention is a water-soluble organic polymer having an organic acid salt structure or an organic acid anion structure.

Examples of the water-soluble organic polymer (A) having an organic acid salt structure or an organic acid anion structure include, as ones having a carboxy group, poly(meth)acrylate salts, salts of carboxyvinyl polymers, salts of carboxymethyl cellulose, poly(meth)acrylic acid anions, anions of carboxyvinyl polymers, and anions of carboxymethyl cellulose; as ones having a sulfonyl group, polystyrene sulfonate salts and polystyrene sulfonic acid anions; and, as ones having a phosphonyl group, polyvinyl phosphonate salts, and polyvinyl phosphonic acid anions. Examples of the salts include sodium salts, ammonium salts, potassium salts, and lithium salts. The (meth)acrylic acid in the present invention refers to both acrylic acid and methacrylic acid.

The water-soluble organic polymer (A) may be cross-linked or copolymerized, and both fully neutralized products and partially neutralized products thereof can be used.

The weight average molecular weight of the water-soluble organic polymer (A) is, in terms of polyethylene glycol by gel permeation chromatography (GPC), preferably from 1,000,000 to 10,000,000, and the weight average molecular weight is more preferably from 2,000,000 to 7,000,000.

Water-soluble organic polymers available as commercial products have a weight average molecular weight labelled on the commercial products of preferably from 1,000,000 to 10,000,000, and the weight average molecular weight is more preferably from 2,000,000 to 7,000,000.

In the present invention, the water-soluble organic polymer (A) is preferably a water-soluble organic polymer compound having a carboxylate salt structure or a carboxy anion structure and is particularly preferably a fully neutralized or partially neutralized polyacrylate salt. Specifically, the water-soluble polymer (A) is preferably a fully neutralized or partially neutralized sodium polyacrylate and is particularly preferably a fully neutralized or partially neutralized non-cross-linked high polymerization degree sodium polyacrylate having a weight average molecular weight of from 2,000,000 to 7,000,000.

The content of the water-soluble organic polymer (A) is from 0.01% by mass to 20% by mass and preferably from 0.1% by mass to 10% by mass relative to 100% by mass of the hydrogel.

<Component (B): Silicate Salt>

The component (B) according to the present invention is a silicate salt and is preferably a water-swellable silicate salt particle.

Examples of the silicate salt (B) include smectite, bentonite, vermiculite, and mica, which preferably form a colloid with water or a water-containing solvent as a dispersant. The smectite is a group name of montmorillonite, beidellite, nontronite, saponite, hectorite, stevensite, and the like. Examples of the shape of primary particles of the silicate salt particle include disc-like, plate-like, spherical, particulate, cubic, needle-like, rod-like, and amorphous. Disc-like or plate-like shape having a diameter of from 5 nm to 1,000 nm is preferable.

Preferable specific examples of the silicate salt (B) include a layered silicate salt; examples thereof easily available as commercial products include LAPONITE (registered trademark of Rockwood Additives Ltd.) XLG (synthetic hectorite), XLS (synthetic hectorite containing sodium pyrophosphate as a dispersant), XL21 (sodium magnesium fluorosilicate), RD (synthetic hectorite), RDS (synthetic hectorite containing an inorganic polyphosphate salt as a dispersant), and S482 (synthetic hectorite containing a dispersant) manufactured by Rockwood Additives Ltd.; LUCENTITE (registered trademark of Co-op Chemical Co., Ltd.) SWN (synthetic smectite) and SWF (synthetic smectite), micro mica (synthetic mica), and SOMASIF (registered trademark of Co-op Chemical Co., Ltd., synthetic mica) manufactured by Co-op Chemical Co., Ltd.; KUNIPIA (registered trademark of Kunimine Industries Co., Ltd., montmorillonite), SUMECTON (registered trademark of Kunimine Industries Co., Ltd.) SA (synthetic saponite) manufactured by Kunimine Industries Co., Ltd.; and BEN-GEL (registered trademark of Hojun Co., Ltd., a refined product of natural bentonite) manufactured by Hojun Co., Ltd.

The content of the silicate salt (B) is from 0.01% by mass to 20% by mass and preferably from 0.1% by mass to 15% by mass relative to 100% by mass of the hydrogel.

<Component (C): Dispersant for Silicate Salt>

The component (C) according to the present invention is a dispersant for the silicate salt and is preferably a dispersant for water-swellable silicate salt particles.

Dispersants or peptizers used for the purpose of improving the dispersability of silicate salts and delaminating layered silicate salts can be used as the dispersant (C).

Examples of the dispersant (C) include, as phosphate salt-based dispersants, sodium orthophosphate, sodium pyrophosphate, sodium tripolyphosphate, sodium tetraphosphates, sodium hexametaphosphate, sodium polyphosphates; as polycarboxylate salt-based dispersants, sodium poly(meth)acrylate, ammonium poly(meth)acrylate, poly(sodium acrylate-co-sodium maleate), and poly(ammonium acrylate-co-ammonium maleate); as ones functioning as alkalis, sodium hydroxide and hydroxylamine; as ones forming insoluble salts or complex salts by the reaction with polyvalent cations, sodium carbonate and sodium silicate; and as other organic peptizers, polyethylene glycols or polypropylene glycols having a weight average molecular weight of from 200 to 20,000, sodium humate, and sodium ligninsulfonate.

Among them, the phosphate salt-based dispersants, the polycarboxylate salt-based dispersants, and the other organic peptizers are preferable. The polycarboxylate salt-based dispersants preferably have a weight average molecular weight of from 1,000 to 20,000.

Specifically, sodium pyrophosphate is preferable as one of the phosphate salt-based dispersants, a sodium polyacrylate or an ammonium polyacrylate having a weight average molecular weight of from 1,000 to 20,000 is preferable as one of the polycarboxylate salt-based dispersants, and a polyethylene glycol (PEG 900 or the like) having a weight average molecular weight of from 200 to 20,000 is preferable as one of the other organic peptizers.

It is known that a low polymerization degree sodium polyacrylate having a weight average molecular weight of from 1,000 to 20,000 functions as a dispersant by a mechanism including producing negative electric charges originated from carboxy anions on the surface of the particles through interactions with silicate salt particles and dispersing the silicate salt through the repulsion of the electric charges.

The content of the dispersant (C) is from 0.001% by mass to 20% by mass and preferably from 0.01% by mass to 10% by mass relative to 100% by mass of the hydrogel.

In the present invention, when using a silicate salt containing a dispersant as the component (B), the dispersant of the component (C) may be further added or may not be added.

The hydrogel forming composition according to the present invention may contain monohydric or polyhydric alcohols such as methanol, ethanol, and glycol, formamide, hydrazine, dimethyl sulfoxide, urea, acetamide, potassium acetate, and the like that are intercalated between layers of the layered silicate salt to promote delamination.

<Component (D): Polyhydric Alcohol>

The component (D) polyhydric alcohol according to the present invention remarkably increases the mechanical strength of the hydrogel with the content of the silicate salt (B) of the hydrogel maintained and is preferably a water-soluble polyhydric alcohol.

The polyhydric alcohol is a dihydric or higher hydric alcohol; examples thereof include glycerin, polyglycerins (diglycerin, triglycerin, tetraglycerin, or the like), ethylene glycol, propylene glycol, polyethylene glycol (PEG 600 or the like), polypropylene glycol, diethylene glycol, triethylene glycol, tetraethylene glycol, dipropylene glycols, 1,5-pentanediol (pentamethylene glycol), 1,2,6-hexanetriol, octylene glycol (ethohexadiol), butylene glycols (1,3-butylene glycol, 1,4-butylene glycol, 2,3-butanediol, or the like), hexylene glycols, 1,3-propanediol (trimethylene glycol), and 1,6-hexanediol (hexamethylene glycol).

Among these, glycerin, diglycerin, ethylene glycol, propylene glycol, butylene glycols, polyethylene glycol, and polypropylene glycol are preferable, and glycerin is particularly preferable.

The content of the polyhydric alcohol (D) is from 0.1% by mass to 99% by mass and preferably from 1% by mass to 60% by mass relative to 100% by mass of the hydrogel.

A preferable combination of the water-soluble organic polymer (A), the silicate salt (B), the dispersant (C) for the silicate salt, and the polyhydric alcohol (D) is, relative to 100% by mass of the hydrogel, from 0.1% by mass to 10% by mass of a fully neutralized or partially neutralized non-cross-linked high polymerization degree sodium polyacrylate having a weight average molecular weight of from 2,000,000 to 7,000,000 as the component (A), from 0.1% by mass to 15% by mass of water-swellable smectite or saponite as the component (B), from 0.01% by mass to 10% by mass of sodium pyrophosphate, from 0.01% by mass to 10% by mass of a sodium polyacrylate having a weight average molecular weight of from 1,000 to 20,000, or from 0.01% by mass to 10% by mass of a polyethylene glycol having a weight average molecular weight of from 200 to 20,000 as the component (C), and from 1% by mass to 60% by mass of glycerin as the component (D).

[Hydrogel and Method for Manufacturing the Hydrogel]

The hydrogel according to the present invention is obtained by gelatinizing the hydrogel forming composition.

The gelatinization using the hydrogel forming composition can be gelatinized by mixing a mixture of three components of the hydrogel forming composition, an aqueous solution thereof, or an aqueous dispersion thereof and the residual one component, an aqueous solution thereof, or an aqueous dispersion thereof. The gelatinization can also be performed by adding water to a mixture of the components.

A method for mixing the components of the hydrogel forming composition can be mechanical or manual stirring or ultrasonication, and among them, the mechanical stirring is preferable. The mechanical stirring can use, for example, magnetic stirrers, propeller type stirrers, planetary centrifugal mixers, dispersers, homogenizers, shakers, vortex mixers, ball mills, kneaders, line mixers, ultrasonic oscillators, or the like. Among them, mixing with planetary centrifugal mixers is preferable.

The temperature on mixing is from the freezing point to the boiling point of an aqueous solution or an aqueous dispersion, which is preferably from −5° C. to 100° C. and more preferably from 0° C. to 50° C.

Although the mixture is weak in strength and is sol-like immediately after mixing, it gelatinizes after being allowed to stand still. The time during which it is allowed to stand still is preferably from 2 hours to 100 hours. The temperature at which it is allowed to stand still is from −5° C. to 100° C. and preferably from 0° C. to 50° C. By pouring the mixture into a mold or extrusion molding the mixture before the gelatinization immediately after mixing, a gel having a desired shape can be produced.

The term "self-supporting property" of a hydrogel, which is usually used without being defined in academic papers and patent documents, is used in the present specification to mean that, because of having sufficient strength, the shape of a gel can be retained even without a support such as a container.

The strength of a hydrogel obtained can be measured with a piercing rupture strength measuring apparatus, for example. For example, a cylindrical hydrogel having a diameter of 28 mm and a height of 16 mm is produced, and measurement can be performed with CREEP METER RE2-33005B manufactured by Yamaden Co., Ltd. The method of measurement includes pressing a 3-mm diameter cylindrical shaft (a plunger manufactured by Yamaden Co., Ltd., shape: cylinder, No. 4S, model: P-4S) against the top of the gel with a speed of 1 mm/second and measuring the stress before rupture. The rupture stress of a hydrogel obtained in the present invention with the piercing rupture strength measuring apparatus is from 5 kPa to 10,000 kPa. For uses requiring high strength, examples of the lower limit value thereof include 25 kPa, 300 kPa, and 600 kPa, and examples of the upper limit value thereof include 1,300 kPa, 2,000 kPa, and 5,000 kPa. Examples thereof include from 300 kPa to 1,300 kPa and from 600 kPa to 1,300 kPa.

EXAMPLES

The present invention will be described more specifically with reference to examples. The present invention is not limited to the examples.

Example 1

Manufacture of 3% LAPONITE XLS Hydrogel Containing 50% Glycerin

Three parts of LAPONITE XLS (a dispersant-containing clay mineral manufactured by Rockwood Additives Ltd.) and 22 parts of water were mixed and stirred at 25° C. with a magnetic stirrer until a uniform aqueous dispersion was produced. Twenty five parts of glycerin was added thereto, and the mixture was stirred for 1 hour at 25° C. Meanwhile, 1 part of a high polymerization degree sodium polyacrylate (ARONVIS MX manufactured by Toagosei Co., Ltd., having a molecular weight of from 2,000,000 to 3,000,000), 24 parts of water, and 25 parts of glycerin were mixed and stirred at 25° C. with a magnetic stirrer until a uniform aqueous solution was produced. These two liquids were mixed, were stirred at 25° C. at 2,000 rpm for 10 minutes with a planetary centrifugal mixer (ARE-310 manufactured by Thinky Corporation), and were then allowed to stand still for 24 hours to obtain a glycerin-containing hydrogel.

Comparative Example 1

Manufacture of Glycerin-Free 3% LAPONITE XLS Hydrogel

Three parts of LAPONITE XLS (a dispersant-containing clay mineral manufactured by Rockwood Additives Ltd.) and 47 parts of water were mixed and stirred at 25° C. with a magnetic stirrer until a uniform aqueous dispersion was produced. Meanwhile, 1 part of a high polymerization degree sodium polyacrylate (ARONVIS MX manufactured by Toagosei Co., Ltd., having a molecular weight of from 2,000,000 to 3,000,000) and 49 parts of water were mixed and stirred at 25° C. with a magnetic stirrer until a uniform aqueous solution was produced.

These two liquids were mixed, were stirred at 25° C. at 2,000 rpm for 10 minutes with the planetary centrifugal mixer (ARE-310 manufactured by Thinky Corporation), and were then allowed to stand still for 24 hours to obtain a glycerin-free hydrogel.

Example 2

Piercing Strength Test on Hydrogels

Cylindrical hydrogels with a diameter of 28 mm and a height of 16 mm were produced on the conditions of Example 1 and Comparative Example 1, and piercing strength measurement was performed thereon with CREEP METER RE2-33005B manufactured by Yamaden Co., Ltd. In the measurement, a 3-mm diameter cylindrical shaft (a plunger manufactured by Yamaden Co., Ltd., shape: cylinder, No. 4S, model: P-4S) was pressed against the top of the gels with a speed of 1 mm/second, and the distortion rate and the stress before rupture were measured. The measurement result is shown in FIG. 1 and Table 1. The glycerin-containing hydrogel (Example 1) showed mechanical strength four times larger than that of the glycerin-free hydrogel (Comparative Example 1), showing remarkably high rupture strength. In other words, the addition of glycerin to the hydrogel can remarkably increase the strength of the hydrogel.

TABLE 1

| | Polyhydric alcohol | Rupture stress [kPa] | Distortion rate [%] |
|---|---|---|---|
| Example 1 | Glycerin [50%] | 1,211 | 94 |
| Comparative Example 1 | Absent | 321 | 93 |

INDUSTRIAL APPLICABILITY

In the hydrogel having a self-supporting property according to the present invention, the viscoelasticity such as rupture strength and deformation rate of the hydrogel can be adjusted depending on its raw material constitution. The hydrogel having a self-supporting property according to the present invention can be gelatinized at room temperature and molded freely. The hydrogel having a self-supporting property according to the present invention can be used in various products utilizing its characteristics.

Examples of the products include medical materials such as external medicine bases such as wound dressing, cataplasms, and hemostatic materials, sealant materials for surgery, scaffolding materials for regenerative medicine, implant materials such as artificial corneas, artificial lenses, artificial vitreous bodies, artificial skin, artificial joints, artificial cartilage, materials for breast augmentation, and medical materials for soft contact lenses; medium materials for tissue culturing, microbial culturing, and the like; cosmetic materials such as lotions, milky lotions, cream, cosmetic fluids, sunscreen, foundation, partial makeup, facial cleansers, skin cleansers, shampoo, conditioner, styling agents, hair dye, cleansing agents, and sheets for packing; sanitary materials such as diapers for children and adults and sanitary napkins; gel materials for aromatics and deodorants; confectionery and gum materials for dogs; materials for chromatographic carriers; materials for bioreactor carriers; materials for separation membranes; building/construction materials such as noncombustible materials for construction, fireproofing covering materials, humidity control materials, seismic buffer materials, mudflow preventing materials, and sandbags; greening materials such as soil water retention agents, raising media, and agricultural and horticultural hydroponic supports; toy materials such as children's toys and models; materials for stationeries; shock absorbing materials for sporting goods such as sports shoes and protectors; cushion materials for shoe soles; buffer materials for bulletproof vests; buffer materials for automobiles and the like; buffer materials for transportation; packing materials; buffering/protecting mat materials; buffering within electronic devices; buffer materials for transporting wagons for precision components such as optical devices and semiconductor-related components; vibration-proof/damping materials for industrial equipment; sound reduction materials for industrial equipment such as motor-using equipment and compressors; coating materials for frictional parts of environment-conscious material apparatuses such as rubber substitute materials for tires and rubber bands and plastic substitute materials; coating additives; waste disposal such as gelators for waste mud and lost circulation preventing agents; adhesives; sealants for sealing; electronic materials such as gel electrolyte materials for primary cells, secondary cells, and capacitors, gel electrolyte materials for dye-sensitized solar cells, and materials for fuel cells; and materials for photographic films.

The invention claimed is:

1. A hydrogel forming composition that is capable of forming a hydrogel having a self-supporting property, the hydrogel forming composition characterized by comprising:
a water-soluble organic polymer having an organic acid salt structure or an organic acid anion structure;
a silicate salt;
a dispersant for the silicate salt; and
a polyhydric alcohol.

2. The hydrogel forming composition according to claim 1, wherein
the polyhydric alcohol is selected from the group consisting of glycerin, diglycerin, ethylene glycol, propylene glycol, butylene glycols, polyethylene glycol, and polypropylene glycol.

3. The hydrogel forming composition according to claim 1, wherein
the water-soluble organic polymer is a water-soluble organic polymer compound having a carboxylate salt structure or a carboxy anion structure.

4. The hydrogel forming composition according to claim 3, wherein
the water-soluble organic polymer compound is a fully neutralized or partially neutralized polyacrylate salt.

5. The hydrogel forming composition according to claim 4, wherein
the water-soluble organic polymer compound is a fully neutralized or partially neutralized polyacrylate salt having a weight average molecular weight of 1,000,000 to 10,000,000.

6. The hydrogel forming composition according to claim 1, wherein
the silicate salt is a water-swellable silicate salt particle.

7. The hydrogel forming composition according to claim 6, wherein
the silicate salt is a water-swellable silicate salt particle selected from the group consisting of smectite, bentonite, vermiculite, and mica.

8. The hydrogel forming composition according to claim 1, wherein
the dispersant is a dispersant for a water-swellable silicate salt particle.

9. The hydrogel forming composition according to claim 8, wherein
the dispersant is one or two or more compounds selected from the group consisting of sodium orthophosphate, sodium pyrophosphate, sodium tripolyphosphate, sodium tetraphosphates, sodium hexametaphosphate, sodium polyphosphates, sodium poly(meth)acrylate, ammonium poly(meth)acrylate, poly(sodium acrylate-co-sodium maleate), poly(ammonium acrylate-co-ammonium maleate), sodium hydroxide, hydroxyamine, sodium carbonate, sodium silicate, polyethylene glycols or polypropylene glycols having a weight average molecular weight of from 200 to 20,000, sodium humate, and sodium ligninsulfonate.

10. A hydrogel having a self-supporting property, formed of the hydrogel forming composition as claimed in claim 1.

11. The hydrogel according to claim 10, wherein
10% by mass or more of a polyhydric alcohol is contained relative to 100% by mass of the hydrogel.

* * * * *